Oct. 18, 1960 R. WIESMANN 2,956,366
DEVICE FOR COMBATTING INSECTS, IN PARTICULAR, FLIES
Filed Dec. 16, 1958

Thin Dark-Red Porous Disc Impregnated With Insecticidal Substance and Foodstuff for Flies Area: at least 10 sq. cm.

INVENTOR:
ROBERT WIESMANN
BY:
Wenderoth, Lind & Ponack
Attys

United States Patent Office 2,956,366
Patented Oct. 18, 1960

2,956,366

DEVICE FOR COMBATTING INSECTS, IN PARTICULAR, FLIES

Robert Wiesmann, Binningen, near Basel, Switzerland, assignor to J. R. Geigy A.-G., Basel, Switzerland Filed Dec. 16, 1958, Ser. No. 780,695

Claims priority, application Switzerland Dec. 24, 1957

11 Claims. (Cl. 43—131)

The present invention concerns new devices for combatting injurious or annoying insects, in particular house flies (*Muscae domesticae*).

The longer flies have been combatted in enclosed spaces, such as living and store rooms, stables etc. by spraying the walls and ceilings with solutions, emulsions or suspensions of contact insecticides, the less satisfactory are the results obtained due, in particular, to the often polyvalent resistance quickly developed by the flies to such substances. On the other hand, often the use of insecticidal stomach poisons in poisonous baits is unsuccessful because of, in particular, the insufficient attraction power of such baits.

The new devices according to the present invention are characterised in particular by a good attraction power under the most various conditions so that the most effective use is made of the activity of the stomach poisons contained therein which may be supplemented by contact poisons also. In order to do this, the devices according to the present invention must conform to the following 7 requirements:

(1) They must be made of porous material such as, e.g. cardboard, felt etc.;

(2) The material must be flat, i.e. two dimensions are relatively large and the third small; discs are preferred to triangles or four-cornered sheets;

(3) The flat object must be of a warm, dark red shade which may vary towards blue but more towards brown; light red and other light or dark shades, not even spots thereof, with the exception of black, may not be present;

(4) The flat object must be at least 10 sq. cm. large; in practice discs of about the size of a beer mat or strips of at least 2–3 cm. wide have proved best;

(5) The porous object must contain a stomach poison which is at least partially soluble in water; it may also contain an additional contact poison;

(6) The porous object must also contain a foodstuff preferred by insects, such as sugar, syrup, honey etc.;

(7) During use the device must be damp, so that in dry rooms it should be moistened occasionally; this promotes the take-up of the poison by the flies alighting thereon and also the dark red colour is made deeper.

Other conditions are less important, but in special cases further variations may be necessary. Corresponding to the above conditions, the devices according to the present invention consist of a porous sheet or strip of damp, brownish to bluish red material which becomes dark at least after moistening and which contains a substance which is at least partly water-soluble and is toxic to flies on being sucked up or imbibed by them, and possibly additionally on contact, and a foodstuff as well as possibly other additives, which material must have a surface of at least 10 sq. cm.; the moisture necessary for use can also be supplied subsequently. With regard to the shade, it should be stressed that it becomes deeper on moistening so that the colour should only be judged in the moistened condition. Black spots on a dark red background have a clear attraction; advantageously they can be made to look like flies. On the other hand, a reflection from the ultra violet is very disadvantageous and should not be present in the dark red shades used. Comparative tests of dark carmine red or brown red surfaces with those of other colours showed a very surprising preference for the dark red surfaces. Such surfaces have about a five times greater attraction for flies than dark blue surfaces in the same cage, about seven times greater attraction than green, yellow or pale blue surfaces, ten times greater attraction than pale red surfaces and about sixteen times greater attraction than white surfaces. In addition, dark red surfaces excite the flies in particular to the extension of the proboscis and thus, to suck. The attraction of the red colour also exceeds that of moisture to a great extent; for example, a dry, red cardboard disc still attracts four times more flies than a damp white disc in spite of the fact that the latter has about a ten times stronger attraction than a dry white disc.

The devices according to the present invention can be produced either by giving a dark red colour to small sheets or strips of porous material which have already been impregnated with a solution or emulsion of one or of mixtures of several insecticidal substance(s), foodstuffs and, possibly, with other additives, or in reverse and advantageously, corresponding materials which are already coloured an intensive red can be impregnated with a solution or emulsion of one or of mixtures of several insecticidal substance(s), foodstuffs and, possibly, other additives. Round, oval or straight sided pieces of cardboard or stout unsized paper or of porous elastic synthetic materials (rubber foam), also pieces of felt and plates made of sawdust can be named as suitable porous materials, and strips of natural or synthetic fibres as well as strips of rubber foam, unsized paper or felt can be used as porous materials.

The insecticidal active substances which are at least partly water-soluble used for the impregnation of these materials can be pure stomach poisons the action of which only becomes satisfactory after the devices have been moistened, in that they are taken up by the insects together with the liquid contained in the carriers. Also substances or mixtures of substances which can be used well or are often more advantageous however, are those which are effective both on taking up by sucking and on touching with the tarsi, i.e. contact poisons as well as stomach poisons. The substances used should also have a certain degree of stability to water and should certainly not be easily decomposed with water to form non-insecticidal substances or form substances which are much more toxic to warm-blooded animals. Certain carbamates have proved to be excellently suitable active ingredients such as, e.g. the water soluble 3-methyl-pyrazolyl-(5)-dimethyl carbamate, in particular also mixed with 1-dimethyl carbamyl-3-methyl-pyrazolyl-(5)-dimethyl carbamate, also 1-isopropyl-3-methyl-pyrazolyl-(5)-dimethyl carbamate and other 1-alkyl-, 1-alkenyl- or 1-alkoxyalkyl-3-methyl-pyrazolyl-(5)-dimethyl carbamates; also however, derivatives of phosphoric acids and phosphonic acids such as, e.g. O-(2.2-dichlorovinyl)-O,O-dimethyl phosphate or $\alpha$-hydroxy-$\beta,\beta,\beta$-trichlorethyl phosphonic acid dimethyl ester, as well as inorganic stomach poisons such as, e.g. sodium arsenite or sublimate (mercuric chloride) can be used as active substances.

By foodstuffs are meant in particular sugar and crude products containing sugar such as unrefined sugar or molasses as well as products containing glucose and or fructose such as starch syrup, honey or invert sugar which induce the flies to suck and, in addition, keep the devices moist for a long time. Additions of polyhydroxy compounds such as glycerine or other suitable hygroscopic substances can also serve the same purpose. Further, the addition of capillary active, ionogenic or non-ionogenic substances can cause an increased take-up of the active substance through the tarsi, whilst fatty acids such as, e.g. oleic acid promote the take-up of active ingredient through the tarsi and at the same time hinder the drying out of the devices.

Damp and warm places in the rooms to be protected are preferred for the positioning of the devices according to the present invention, in particular draughts should be avoided. As, at a room temperature of 23° C., a cardboard disc of 38–40° has an optimal attraction, sometimes the heating available in the room can be used to bring the devices to this temperature. It should be remembered however that, for example near radiators and hot water pipes, the air is relatively dry and in strong motion. An excellent attraction is certainly obtained by a particular heating appliance which is restricted to the exposed device, for example an electric hot plate having a depression in which the moistened red cardboard disc is placed.

Presently preferred exemplary embodiments of the invention are illustrated on the accompanying sheet of drawings, on which:

Figure 1:
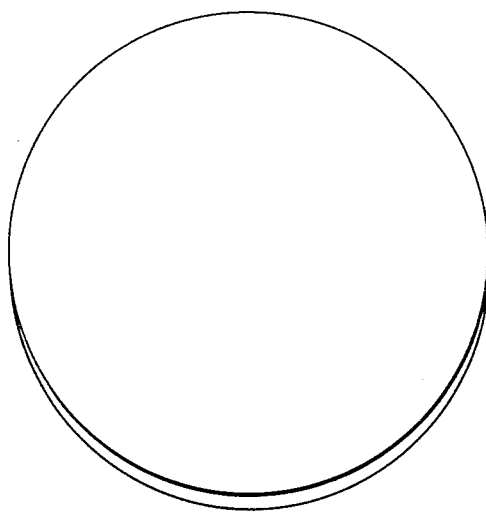
Fig. 1 is a perspective view of a device according to the invention, in the form of a disc.
Figure 3:
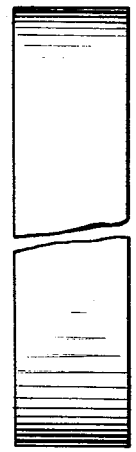
Fig. 3 is a view of a device in the form of a strip rather than of a disc.
Figure 2:
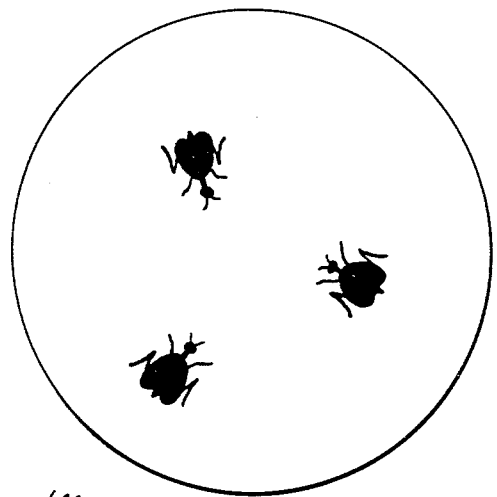
Fig. 2 is a view of a similar disc imprinted with black spots in simulation of flies thereon.

The following examples further illustrate the production of some types of devices according to the present invention and their use without limiting it, however, to these examples.

*Example 1*

Flat cardboard discs of about 11 cm. diameter, so-called beer mats, are coloured with an acetone solution of a dyestuff which is soluble in acetone, e.g. 0.025 mg. of Frobeno Red per disc. If desired, the discs can be printed with black spots representing flies. The discs are then each impregnated with 0.50 g. of active ingredient, e.g. 3-methyl-pyrazolyl-(5)-dimethyl carbamate or a mixture of about 1 part of 3-methyl-pyrazolyl-(5)-dimethyl carbamate and about 4 parts of 1-dimethyl carbamyl-3-methyl pyrazolyl-(5)-dimethyl carbamate, and 10 g. of sugar.

Also, to ensure that the moistened discs remain moist for a long time, if desired, glycerine can be added, and a slight amount of an ionogenic or non-ionogenic capillary active substance, e.g. N-(α-undecyl-p-methylbenzyl)-N,N,N-trimethyl ammonium methyl sulphate can be added so that an increased amount of active ingredient can be taken up by the tarsi. Further, the later revival of poisoned flies can be eliminated by the addition of an inorganic substance such as, e.g. 150–200 mg. of sodium arsenite or 15–20 mg. of sublimate. In order to exclude danger to man and domestic animals as well as losses of active ingredient due to flooding out, the cardboard discs so treated are advantageously fitted into suitable tin dishes so that no other plates are used as containers and no water containing active ingredient is poured away.

The discs so prepared are placed in the warmest possible place in living rooms where they are protected from draughts, and to attain the quickest action against flies, they are moistened each day. They also have an attraction for and lethal effect on flies however, in a dry condition.

Particularly evenly coloured discs are obtained if the mixture of mechanical wood pulp and cellulose fibres used to produce them is dyed for example with 2% of Diphenyl Scarlet RS 200 followed by 1% of Safranine B, calculated on the dry weight of the fibre mass.

*Example 2*

Strips of rubber foam about 4 cm. wide and 0.3 cm. thick and of a dark red colour are impregnated with 1 g. of 3-methyl-pyrazolyl-(5)-dimethyl carbamate and sugar per metre. If necessary, the colour of the strips can be intensified by treating them with an acetone solution of Frobeno Red. To combat flies in stables, the strips are fixed for example about 10–15 cm. under the roof in as free a position as possible over the heads and backs of the cows. They retain their attraction and toxic action for 4 to 6 months. Because the air in the stables is already moist, they need not be moistened.

Instead of the active ingredient mentioned above, also for example, the same amount of 1-isopropyl-3-methyl-pyrazolyl-(5)-dimethyl carbamate or of a mixture of about 4 parts of 1-dimethyl carbamyl-3-methyl-pyrazolyl-(5)-dimethyl carbamate and about 1 part of 3-methyl-pyrazolyl-(5)-dimethyl carbamate can be used.

*Example 3*

Pieces of porous cardboard of 9 x 11 cm. and of a thickness corresponding to a weight of 330 g. per sq. m. are impregnated with a solution of 0.07% Frobeno Red 3B and 0.43% Frobeno Red G in acetone. After drying, they are soaked in a solution of 0.5 g. of a mixture of 1-dimethyl carbamyl-3-methyl-pyrazolyl-(5)-dimethyl carbamate and 3-methyl-pyrazolyl-(5)-dimethyl carbamate and 10 g. of sugar in 29.5 g. of water, about 8 g. being absorbed. The pieces of porous cardboard are then again dried whereupon they contain about 0.1 g. of active ingredient and about 2 g. of sugar. Like the discs mentioned in Example 1, the cardboard can be placed on a glass dish or a plate in a moist condition. One piece is sufficient for a room of about 20–30 m.$^3$.

When producing the cardboard pieces in bulk, they are advantageously dyed in the fibre, e.g. with 2% of Diphenyl Scarlet RS 200 calculated on the dry weight of the fibres.

The dyestuffs named in the above examples are given in the Colour Index as follows:

Frobeno Red 3B _____ C.I. Solvent Red 61.
Frobeno Red G _____ C.I. Solvent Red 20.
Diphenyl Fast Scarlet RS _____ C.I. No. 29,160.
Safranine B _____ C.I. No. 50,240.

For the dyeing of sheets or pieces of cardboard or of mechanical wood pulp, cellulose fibres or cotton linters used for the production thereof, in addition to the two dyestuffs last named above, also mixtures, for example of:

Diphenyl Fast Blue Red B _____ C.I. Direct Red 86.

and/or

Fuchsine G _____ C.I. No. 42,510.

on the one hand, and

Diphenyl Fast Brown 2 RL ____ C.I. Direct Red 116.
Brown AT _____ C.I. No. 21,010.

on the other hand, can be used. The dyestuffs are fixed with, for example, aluminium sulphate. The above enumeration of the dyes which may be used is, of course, not complete. In particular, when combined with brown, the brownish to bluish dark red shades used according to the present invention may be produced with a selection of dyes ranging from orange to violet.

I claim:

1. A device for combatting house flies (*Muscae domesticae*), consisting of a sheet of dark red porous material, the dark red color of which is intensified on moistening of the material, and containing a substance which is at least partly water-soluble and is toxic to the flies when taken thereby as food, and also containing a foodstuff acceptable to said flies, said dark red porous material having a surface area of at least 10 sq. cm.

2. A device for combatting house flies (*Muscae domesticae*), consisting of a sheet of dark red porous material, the dark red color of which is intensified on moistening of the material, and containing a substance which is at least partly water-soluble and is toxic to the flies when taken thereby as food, as well as a substance which is toxic to the flies on contact therewith, and also containing a foodstuff acceptable to said flies, said dark red porous material having a surface area of at least 10 sq. cm.

3. A device as defined in claim 1, the said dark red porous material being in moistened form.

4. A device as defined in claim 1, the said dark red porous material being in dry form, whereby the device is suitable for storing, transport and sale, and whereby moisture may be subsequently supplied.

5. A device for combatting house flies (*Muscae domesticae*) consisting of a sheet of dark red porous material, the dark red color of which is intensified on moistening of the material, and containing as insecticide at least one member selected from the group consisting of 3-methyl-pyrazolyl-(5)-dimethylcarbamate and 1-dimethyl-carbamyl-3-methyl-pyrazolyl-(5)-dimethyl-carbamate and also containing a foodstuff acceptable to said flies, said dark red porous material having a surface area of at least 10 sq. cm.

6. A device for combatting house flies (*Muscae domesticae*), consisting of a sheet of dark red porous material, the dark red color of which is intensified on moistening of the material, and containing a substance which is at least partly water-soluble and is toxic to the flies when taken thereby as food, and also containing a foodstuff acceptable to said flies, said dark red porous material having a surface area of at least 10 sq. cm., said surface being provided with black spots of a configuration simulating house flies.

7. A device as defined in claim 1, in the form of a strip at least 2 to 3 cm. wide.

8. A device as defined in claim 1, in the form of an arcuate-edged disc.

9. A device as defined in claim 1 in the form of a straight-sided disc.

10. A method of combatting house flies (*Muscae domesticae*) which consists of attracting the flies onto, and poisoning the thus-attracted flies, with a sheet of dark red porous material, the dark red color of which is intensified on moistening of the material, and containing a substance which is at least partly water-soluble and is toxic to the flies when taken thereby as food, and also containing a foodstuff acceptable to said flies, said dark red porous material having a surface area of at least 10 sq. cm.

11. A method of combatting house flies (*Muscae domesticae*) which consists of attracting the flies onto, and poisoning the thus-attracted flies, with a sheet of dark red porous material, the dark red color of which is intensified on moistening of the material, and containing as insecticides at least one member selected from the group consisting of 3-methyl-pyrazolyl-(5)-dimethylcarbamate and 1-dimethyl-carbamyl-3-methyl-pyrazolyl-(5)-dimethyl-carbamate and also containing a foodstuff acceptable to said flies, said dark red porous material having a surface area of at least 10 sq. cm.

References Cited in the file of this patent

Washington Post, page 6, column 8 of the June 1, 1918, issue.